Mar. 6, 1923.
I. MATTSON ET AL
FEED TROUGH FOR ANIMALS
Filed Mar. 30, 1921
1,447,562
2 sheets-sheet 1
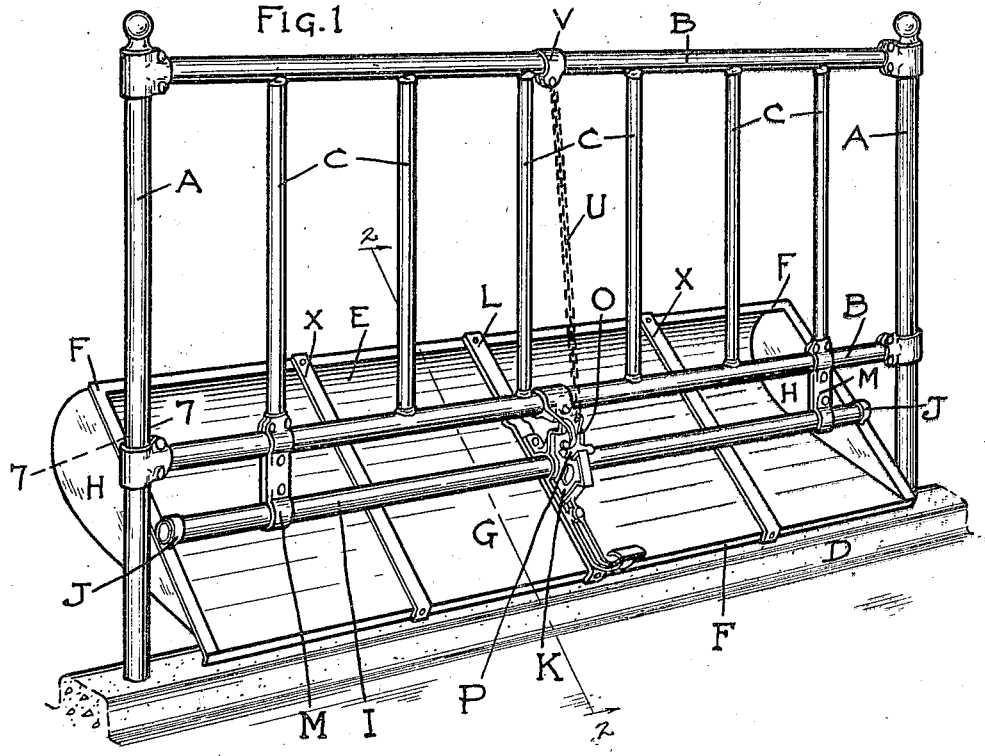
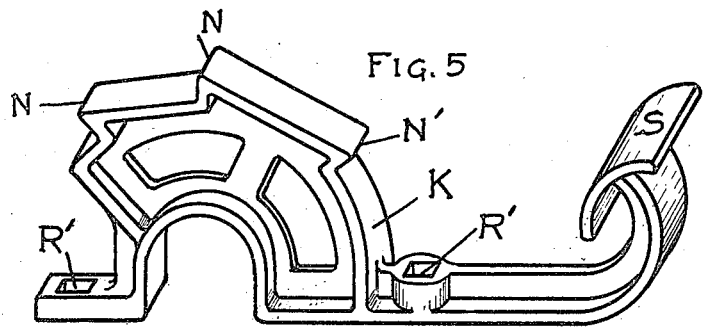
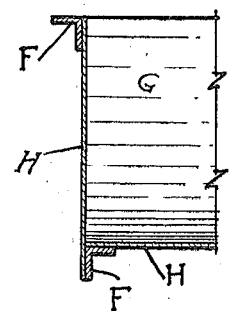
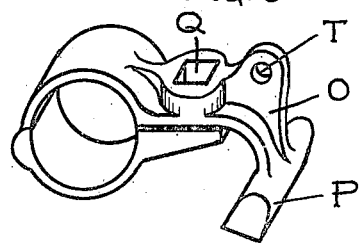
INVENTORS
Ivar Mattson
Robert B Loeder

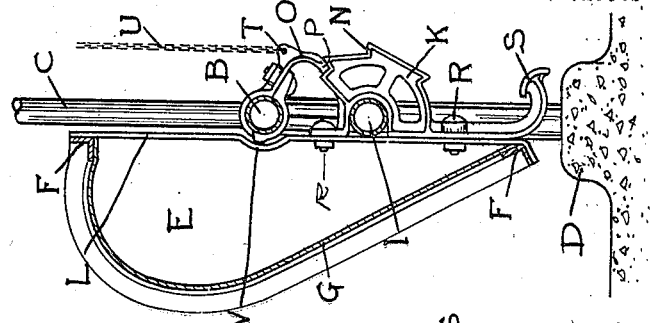
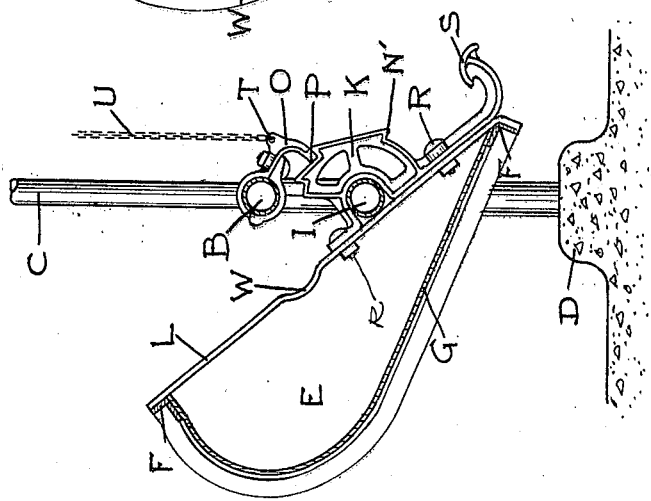
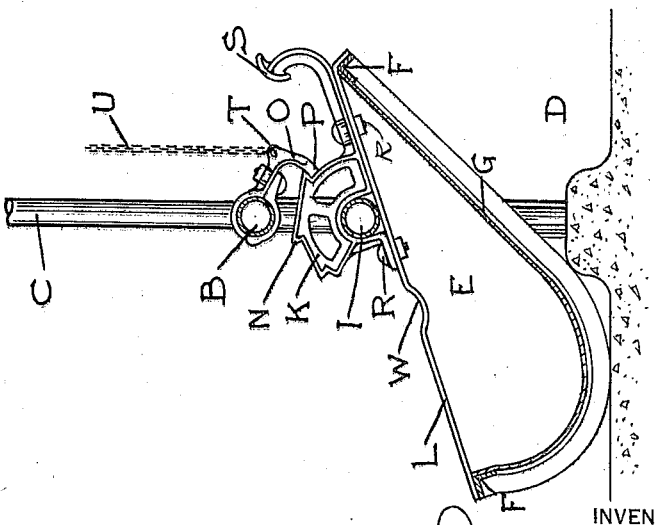

Patented Mar. 6, 1923.

1,447,562

UNITED STATES PATENT OFFICE.

IVAR MATTSON AND ROBERT B. LOUDEN, OF FAIRFIELD, IOWA, ASSIGNORS TO THE LOUDEN MACHINERY COMPANY, OF FAIRFIELD, IOWA, A CORPORATION OF IOWA.

FEED TROUGH FOR ANIMALS.

Application filed March 30, 1921. Serial No. 456,996.

*To all whom it may concern:*

Be it known that we, IVAR MATTSON and ROBERT B. LOUDEN, citizens of the United States, residing at Fairfield, in the county of Jefferson and State of Iowa, have invented a new and useful Improvement in Feed Troughs for Animals, of which the following is a specification.

This invention relates to an improvement in feed-troughs to be used in animal pens, and it consists of an improved manner of attaching the trough to a panel of the pen so the trough may be rotated or tilted into different positions and be held in these positions. Also, of an improved method of operating the trough which will be explained in the specification and be more definitely set forth in the claims.

In the accompanying drawings forming a part of this specification, Fig. 1 is a perspective showing a panel of an animal pen with a feed-trough attached which embodies our invention. Figure 2 is an enlarged transverse section of the lower portion of the device, taken on the line 2—2 of Fig. 1. Figs. 3 and 4 are the same, showing the trough in different positions. Figs. 5 and 6 are enlarged detail views of certain parts of the mechanism which will be hereinafter explained. Figure 7 is an enlarged section of an end of the trough, taken on the line 7—7 of Fig. 1.

Referring to the drawings, A represents the posts, B the top and bottom rails, and C the fillers of a panel of an animal pen, and D is a curb in which the posts are set. Between the curb and the bottom rail there is an elongated open space in which a rectangular shaped feed-trough E is mounted. The trough is provided with angle irons F to which the bottom G and ends H are attached. Longitudinally and centrally along and above the upper edges of the trough a shaft I is attached thereto, preferably by means of clips J connected to the angle irons at the ends of the trough, and also by means of a casting K connected to a central cross bar L, having its ends attached to the angle irons at the sides of the trough. The shaft I is preferably a piece of tubing.

Attached to the bottom rail B, is a pair of clamp castings M having their lower ends adapted to loosely embrace and hold the shaft I in rotatable position. The trough being connected to the shaft I can be tilted on this pivot into different positions, as shown by Figs. 2, 3 and 4. Fig. 2 shows the trough in an intermediate position, the same as in Fig. 1, while Fig. 3 shows the trough in its lowermost, or what may be called its operative position, and Fig. 4 shows it folded up against the panel to which it is connected.

In order to hold the trough in these different positions the casting K is provided with shoulders N and N' which are adapted to be engaged by a dog or latch O which is preferably pivoted on a central portion of the bottom rail B, as shown in Fig. 1. The shoulders N are so disposed that the dog or latch O coming in contact with them will hold the trough in the elevated or partially elevated position, while the shoulder N' being disposed in the opposite direction, will hold the trough in its lowermost or operative position. The contacting portion P of the latch O is arranged so it will contact with the shoulders N and N' in opposite directions.

The latch or dog O is preferably made of two pieces joined together by a bolt passed through the bolt hole Q, or in any other suitable manner so that the latch may be readily placed on the bottom rail B or on any other suitable part of the panel, and be free to turn thereon to engage and disengage the shoulders N and N'. The casting K is preferably connected to the center cross bar L by bolts R passed through the bolt holes R' and through corresponding openings in the cross bar L.

To operate the trough and tilt it from one position to another the casting K is provided with a foot pedal S which extends out beyond one edge of the trough and is extended upward so it will be a distance above said edge. The latch is provided with an eye T or other means for the attachment of a chain or cord U so that the operator by lifting on the chain or cord can raise the contacting portion of the latch from engagement with the shoulders N or N'. The casting K now being free from the latch the operator by placing his foot on the pedal S and pressing down on it can tilt the trough upward from the position shown in Fig. 3 to the position shown by Fig. 2, or by Fig. 4, and by releasing the chain and letting the latch drop to engage the adjacent shoulder N, the trough will be held in elevated position.

On the other hand, the operator by placing his foot on the pedal and lifting the chain or cord U to raise the latch O from engagement with the shoulders N, and by easing the pressure of his foot on the pedal can gradually lower the trough to the position shown by Fig. 3, the overbalancing weight of that side of the trough being sufficient to cause it to assume that position.

The upper end of the chain or cord U is preferably attached to the top rail B by means of a clip V or otherwise, whereby the chain will always be within easy reach of the operator and he can easily and quickly move the trough into the different positions without stooping or getting his hands or feet soiled by direct contact with the trough or its contents. The curb D may be regarded as a raised portion of the floor shown by the horizontal line on its opposite sides. In Fig. 3 the main portion of the trough is shown resting on the floor inside of the pen.

The trough is specially designed for feeding swine either liquid or dry feed. It will be observed that the trough being centrally pivoted over its upper edge to portions of the panel above it and being in the open space below the bottom of the panel will project on opposite sides of the panel when in lowered or operative position. It will also be observed that the most extended projecting side is the deepest and preferably rounded while the other side is shallow and sloping. The former side of the trough is designed to be on the inside of the pen, and to hold the feed for the animal while the other shallow sloping side is designed to be on the outside of the pen to convey the feed from the outside to the main part of the trough.

The foot pedal S and the means to operate the latch are also on this side of the panel and therefore are outside of the pen. It will be further observed that when the trough is in the positions shown by Figs. 3 and 4, the open space in the lower portion of the panel in which the trough is mounted will be effectually closed and that small pigs will be prevented from going through said open space. To clean the trough it is preferable to place it in the intermediate position shown by Fig. 2. When in this position water thrown into the trough will run out and be deposited outside of the curb D, and a broom may be introduced into the inner portions of the trough through the space immediately below or above the shaft I. When the trough is folded up against the inside of the panel as shown in Fig. 4, it will be wholly on the inside of the pen and will be substantially out of the way and will occupy very little space in the pen.

To let the trough fold up as closely as possible against the panel, it is advisable to make a bend or recess W in the cross bar L.

Other cross bars X of lighter material may also be placed in the trough if desired. The construction is exceedingly simple and is convenient and effective in operation.

What we claim is:

1. In combination with a panel of an animal pen having posts set in a curb and a bottom rail connected to said posts a distance above the curb so as to leave an open space bounded above and below by the rail and the curb, and at the ends, by the lower portions of the posts, of a rectangular shaped feed trough located in said space parallel with the panel and its upper central portions being pivotally connected to said bottom rail, whereby it may be tilted to different positions on the pivot, and means pivotally connected to a central portion of the bottom-rail to hold the trough in different positions.

2. In combination with a panel of an animal pen having an elongated open space at its bottom, a rectangular shaped feed trough located in said space in a position parallel with the panel, a shaft also located in said space and parallel with the panel, said shaft being secured to central portions of the upper edges of the trough and pivotally secured to portions of the panel above, and means to rotate the trough on the pivot, and to hold it in different positions of rotation, and to release it therefrom.

3. The combination of a panel of an animal pen having an open space at its bottom with a feed-trough positioned parallel with the panel in said open space, a shaft also positioned parallel with the panel secured to central portions of the upper edges of the trough, a pair of downward extensions attached to the lower edge of the panel having means on their lower ends to pivotally connect the shaft, and means to hold the trough in different positions of rotation and to release it therefrom.

4. The combination of a panel of an animal pen having an open space at its bottom with a feed-trough positioned parallel with the panel in said open space, a shaft also positioned parallel with the panel secured to central portions of the upper edges of the trough, a pair of downward extensions attached to the lower edge of the panel having means on their lower ends to pivotally connect the shaft, a central cross bar secured to upper portions of the trough, a casting having shoulders on its upper edges secured to a central portion of the cross bar, and holding a central portion of the shaft in contact with the cross bar, and a latch to engage the shoulders of the casting and to hold it and the trough to which it is connected in definite positions of rotation and adapted to be released therefrom to permit the trough to be tilted on the shaft from one position to another.

5. The combination of a panel of an animal pen having an open space at its bottom with a feed-trough positioned parallel with the panel in said open space, a shaft also positioned parallel with the panel secured to central portions of the upper edges of the trough, means connected to the panel to pivotally connect the shaft thereto, a central cross bar secured to upper portions of the trough, a casting having shoulders on its outer edge disposed in opposite directions, said casting being secured to a central portion of the cross bar, and a latch having a double faced contacting end to engage the oppositely disposed shoulders and to hold the trough in different positions of rotation, and adapted to be released therefrom.

6. The combination of a panel of an animal pen having an open space at its bottom with a feed-trough positioned parallel with the panel in said open space, a shaft also positioned parallel with the panel secured to central portions of the upper edges of the trough, means connected to the panel to pivotally connect the shaft thereto, a central cross bar secured to upper portions of the trough, a casting having shoulders on its outer edge secured to a central portion of the cross-bar, a latch pivoted to a lower portion of the panel and adapted to engage the shoulders on the casting and hold the trough in different positions of rotation, and upwardly extending means to lift the contacting end of the latch from engagement with the shoulders of the casting and permit the trough to be rotated from one position to another.

7. The combination of a panel of an animal pen having an open space at its bottom with a feed-trough positioned parallel with the panel in said open space, a shaft also positioned parallel with the panel secured to central portions of the upper edges of the trough, means connected to the panel to pivotally connect the shaft thereto, a central cross bar secured to upper portions of the trough, a casting having shoulders on its outer edge secured to a central portion of the cross-bar, a latch pivoted to a lower portion of the panel and adapted to engage the shoulders on the casting and hold the trough in different positions of rotation, and a flexible member connected to the free end of the latch and attached to an upper portion of the panel within easy reach of an operator on that side of the panel.

8. The combination with a panel of an animal pen having an open space at its bottom, of a feed-trough positioned parallel with said panel in said open space, and centrally pivoted to said panel, the side of the trough designed to be on the side of the panel on the inside of the pen, being deeper and heavier than the other side of the trough which will be on the side of the panel designed to be on the outside of the pen, a central cross-bar secured to the upper portions of the trough, a casting having shoulders secured to the cross-bar, a latch adapted to engage the shoulders on the casting and hold the casting in definite positions, and a portion of the casting being extended outwardly and upwardly beyond the edge of the trough to form a foot pedal whereby an operator by pressing his foot on the pedal may tilt the trough into different positions without coming in direct contact with the trough or its contents.

Fairfield, Iowa, March 28th, 1921.

IVAR MATTSON.
ROBERT B. LOUDEN.